Patented Jan. 3, 1933

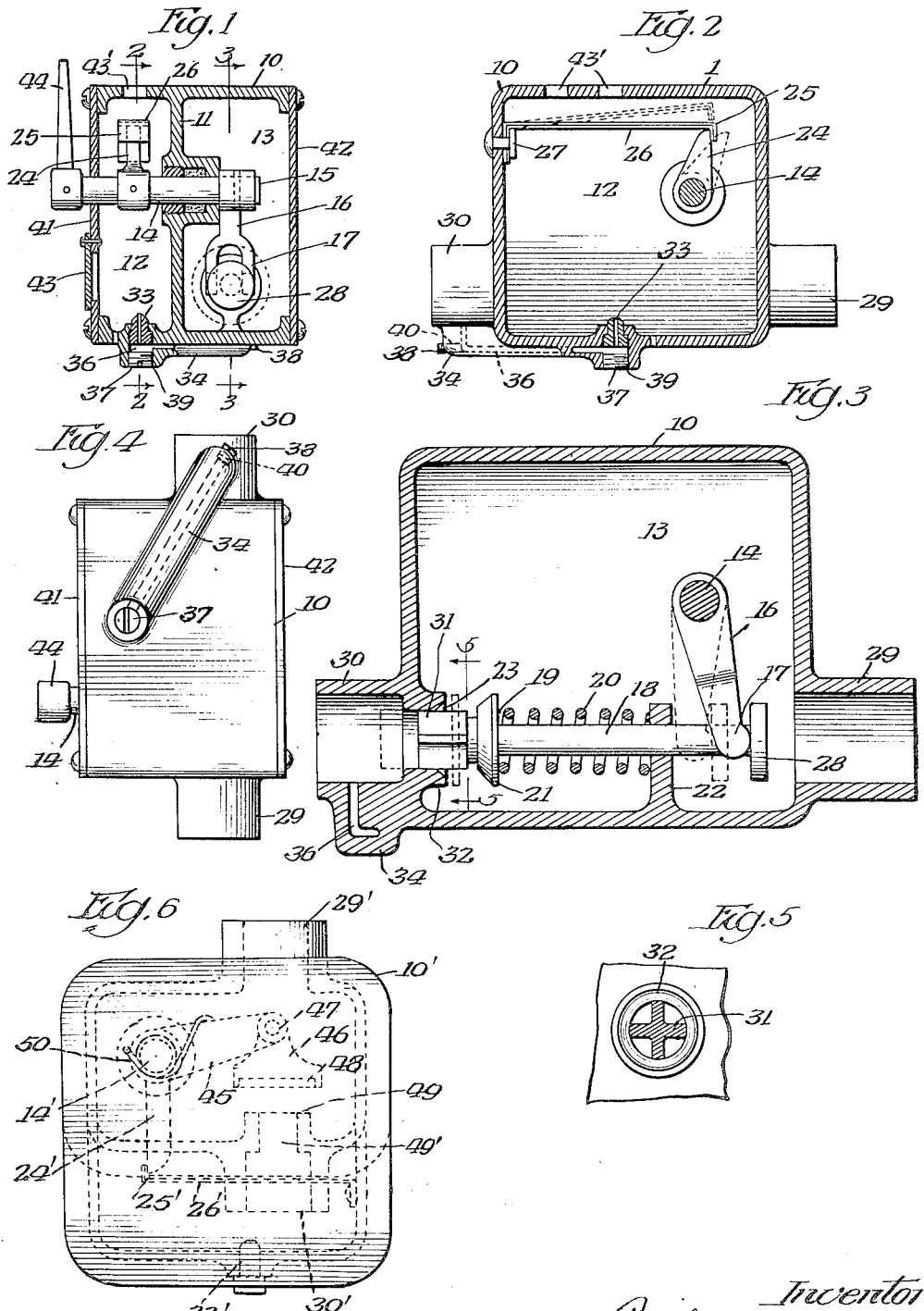

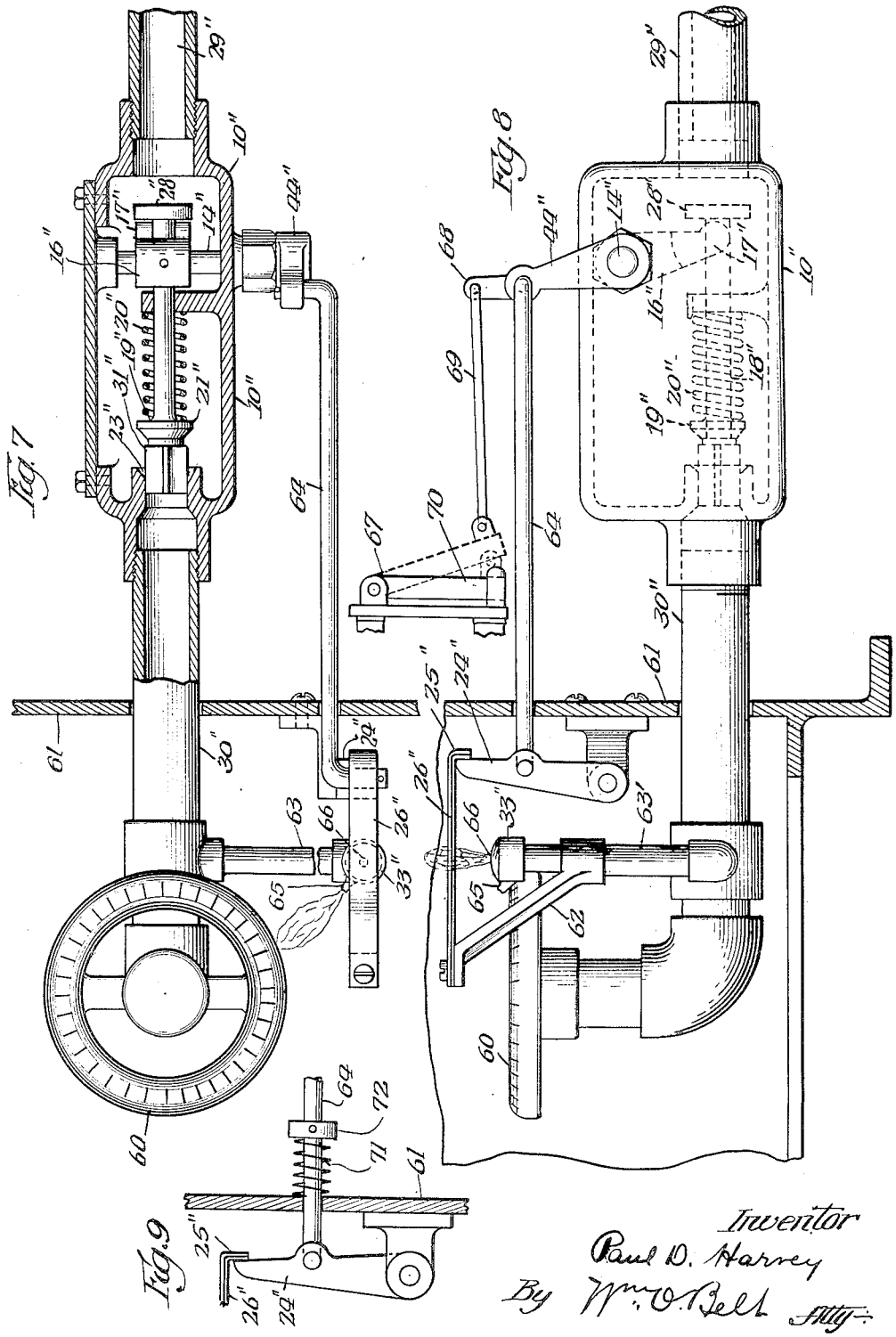

1,892,948

UNITED STATES PATENT OFFICE

PAUL D. HARVEY, OF CHICAGO, ILLINOIS

AUTOMATIC CONTROL

Application filed November 7, 1927. Serial No. 231,411.

This invention relates to thermostatic controls which are adaptable to various uses but which have been particularly designed for gas or oil burning furnaces.

The object of the invention is to provide a thermostatic control which will automatically cut off the fuel supply to the burner and pilot light whenever the pilot light is extinguished on account of insufficient gas pressure in the pilot light supply line.

Another object is to provide a quick acting control which will operate an electric switch with a snap action and thus prevent arcing of the switch contacts, when the pilot light is extinguished.

Another object is to provide a quick or sharp operating lever operated by a spring and which is directly released by a thermosensitive element.

And another object is to provide novel means for controlling a fluid line which is simple and compact in construction, which is positive and quick in operation, and which can be readily and economically manufactured.

In the accompanying drawings illustrating a selected embodiment of the invention the views are as follows:

Fig. 1 is a vertical sectional view of one form of the control.

Fig. 2 is a longitudinal sectional view on the line 2—2 of Fig. 1.

Fig. 3 is an enlarged longitudinal sectional view on the line 3—3 of Fig. 1.

Fig. 4 is a bottom plan view.

Fig. 5 is a detail sectional view on the line 5—5 of Fig. 3.

Fig. 6 is a detail view of a control embodying the invention in a modified form.

Fig. 7 is a top plan view partly in section showing another modification of the invention installed on a furnace and remotely operated.

Fig. 8 is a side elevation of the device shown in Fig. 7 showing an electric switch operated by the control.

Fig. 9 is a detail view of the trip lever and its associated parts for directly operating the electric switch.

Referring to Figs. 1 to 5 of the drawings, 10 designates a casing having a divisional wall 11 forming the compartments 12 and 13.

A shaft 14 mounted in the division wall 11 has an end 15 which extends into the compartment 13 and upon which the lever 16 having a forked end 17 is mounted. The forked end of this lever straddles the stem 18 of the valve 19 which is slidably mounted in the compartment 13.

A spring 20 is arranged on the stem 18 between the valve head 21 and the lug 22 integral with the casing and normally keeps the valve closed against its seat 23 as exemplified by the dotted lines in Fig. 3.

A trip lever 24 in the compartment 12 is fixed to the shaft 14 and is adapted to be engaged with the hook end 25 of the thermosensitive element 26, fixed to the casing at 27, and normally maintains the trip lever in the position shown in full lines in Fig. 2.

The shaft 14 is free to turn so that any movement thereof is transmitted to the lever 16. When the hook end 25 of the thermosensitive element 26 is engaged with the trip lever, Fig. 2, the forked end of the lever 16 presses against the disk 28 on the valve stem 18, compressing the spring 20 and unseating the valve head 21.

A gas inlet 29 connected to a source of supply leads to the compartment 13; and an outlet line 30 leading from the compartment 13 is connected to a suitable burner and supplies the necessary fuel for the burner and the burner pilot light, not shown.

A cross guide 31, mounted in the annular flange 32 on the casing, is fixed to the valve head and maintains the valve in proper axial alinement during the operation of the valve and permits a free passage of gas through the outlet 30 when the valve is open, Fig. 3.

A pilot light 33 is arranged in the compartment 12, Figs. 1 and 2, and receives the fuel therefor from the compartment 13 by any suitable gas tight means. It has been found preferable, however, to cast a part 34 on the bottom of the casing and then drill the same to provide the gas passage 36. Suitable plugs 37 and 38 are threaded into the part 34 to seal the openings 39 and 40 formed during the drilling operation.

The casing may be provided with side covers 41 and 42 detachably connected to the casing to allow ready access to the parts within the casing. The casing is provided with a door 43 suitably hinged to the cover 41 for lighting the pilot light, and holes 43' are provided in the casing to provide the necessary ventilation in the compartment 12 for the pilot light.

A handle lever 44 is secured to the outer end of the shaft 14 outside of the casing to set the trip lever and valve to normal operating position.

The operation of the device is as follows: In starting, the trip lever will not be engaged with the thermo-sensitive element and the valve will be closed, as shown in dotted lines in Figs. 2 and 3.

The handle 44 is moved manually to turn the shaft 14 which will move the trip lever 24 and the lever 16 into normal operating position, and the valve will be open, as shown in full lines in Fig. 3. The pilot light will then be lighted and the handle maintained in the same position until the heat in the chamber 12, furnished by the pilot light will cause the hook end 25 of the thermo-sensitive element 26 to become engaged with the trip lever 24, as shown in full lines in Fig. 2, and the handle may be released. A pilot light for the burner should be lighted as soon as possible after the valve has been opened.

If the gas pressure becomes deficient and the pilot light for the burner is extinguished, the pilot light 33 will also be extinguished, and no heat will be furnished in the compartment 12 to maintain the thermo-sensitive element in arched or normal position. When the element cools and straightens it will release the trip lever and the spring 20 will close the valve 19, and the parts will assume the position shown in dotted lines in Figs. 2 and 3.

In Fig. 6 a casing 10' having a gas inlet 29' is provided and a lever 45 fixed to the shaft 14', mounted in the casing 10' has a valve 46 pivoted thereto at 47. This valve has a rubber face 48 which is adapted to fit against the seat 49 of the gas passage 49'. A coil spring 50 is arranged about the shaft 14' and is connected to the lever to close the valve 46 when the trip lever 24' is released from the hoop end 25' of the thermo-sensitive element 26' and this closes flow to the outlet 30'. An ordinary tube (not shown) may be provided to provide a passage from the gas compartment to the pilot light 33', instead of the arrangement shown in Figs. 1 to 5.

In Figs. 7 and 8 only one compartment is provided in the housing 10", which includes an inlet 29" and an outlet 30", as the trip lever 24" and the thermo-sensitive element 26" are arranged within the firebox of the furnace, or boiler, and the pilot light 33" is used to light the burner 60, and also operate the thermo-sensitive element 26". The trip lever 24" is pivotally mounted on the furnace wall 61 and is held in normal operating position by engagement of the hook end 25" of the element 26" secured to a bracket 62 which is mounted on the vertical portion 63 of the pipe 63' connected to the outlet 30" and supports the pilot light 33".

A rod 64 connects the trip lever 24" with the handle lever 44" so that when the trip lever becomes disengaged from the element 26" the spring 20" will move the valve 19" onto valve seat 23" and cause the trip lever to be moved out of the path of the hook end 25" of the element 26 in the same manner as described relative to Figs. 1 to 5. The valve 19" includes a guide 31" similar to the guide 31. The lever 44" is fast on the shaft 14" and a lever 16" is also fast on this shaft and includes a forked end 17" which straddles the stem 18" of the valve 19".

The pilot light 33" is provided with a gas tip 65 for lighting the burner 61, and a second gas tip 66 for heating the thermo-sensitive element 26".

A knife switch 67, Fig. 8, connected to suitable apparatus for operating an oil burner (not shown) may be controlled by the device. A lug 68 integral with the handle lever 44" has a rod 69 fastened thereto which is connected to the contact 70 of the switch 67 and opens and closes the switch according to the position of the valve 19".

The knife switch 67 may be operated directly from the trip lever by providing a spring 71 on the rod 64, Fig. 9, which is confined between the collar 72 on the rod and the furnace wall 61 so that the action of the trip lever is directly transmitted to the switch 67.

When the pilot light 33" is extinguished for any reason whatever, the trip lever 24" will be released from the thermo-sensitive element and the spring 20" or 71 will cause the valve 19" to be closed and the shaft 14" will be rotated and move the handle lever 44". This movement of the handle lever is transmitted to the rod 69 and operates the switch.

The springs 20" and 71 have sufficient tension to operate the parts with a quick snap action which is transmitted to the switch 67, thus preventing arcing of the switch contacts.

Various devices have been made whereby a thermo-sensitive element is used to operate certain light weight and comparatively small parts, such as a snap switch, but in no case have I seen a thermo-sensitive element which directly engages a trip lever. I have found that in bending the element to engage the trip lever I am able to operate valves having a pressure of 80 pounds; and by using a system of compound levers the element is adapted to control valves operating against a much greater pressure.

Changes may be made in the form, construction and arrangement of the parts without departing from the spirit of the invention or sacrificing any of its advantages and the right is hereby reserved to make all such changes as fairly fall within the scope of the following claims.

I claim:

1. In an automatic control device, a casing, having an elongated opening, a valve member, means for supporting said valve member including a guide portion disposed in said opening and a supporting portion in said casing, means for urging said valve member into position to prevent passage through said opening, a shaft rotatably supported by said casing, means carried by said shaft engaging said valve member, a lever connected to said shaft, a pivotally mounted trip lever, a link connecting said trip lever and said first named lever, a thermostatic element heated by the combustion of fuel passing through said opening, said thermostatic element when heated serving to hold said trip lever and the parts connected thereto against the action of the urging means for said valve member to hold said valve member in open position.

2. The combination of a burner, a supply line connected to said burner and a pilot light for said burner, of a closed casing mounted in said supply line and having inlet and outlet openings and a valve seat about one of said openings, a valve member including a guide extending past said valve seat and a stem extending through a lug in said casing, a spring about said valve stem and extending between the head of said valve member and said lug and urging said head toward said valve seat, a shaft journaled in said casing, a lever in said casing and connected to said shaft and engaging said valve stem, means including said shaft for moving said lever to move said valve against the action of said spring into open position and including a trip lever, and thermo-sensitive means responsive to the heat of the pilot light engageable with said trip lever to hold said valve member in open position.

3. An automatic control including a casing having openings therein, a valve member controlling passage through one of said openings, means for supporting said valve member, means for urging said valve member in one direction, a shaft carried by said casing, a member in said casing on said shaft for holding said valve member against the action of said urging means, a lever on said shaft, a pivotally mounted trip lever, a thermostatic element operable to retain said trip lever in a predetermined position, and a link connecting said trip lever and said first-named lever whereby said shaft and the member on said shaft will be retained in a predetermined position to hold said valve member against the action of said urging means.

PAUL D. HARVEY.